US008780862B2

(12) United States Patent
Zeng

(10) Patent No.: US 8,780,862 B2
(45) Date of Patent: Jul. 15, 2014

(54) VDL2 POWER CONTROL

(75) Inventor: Dongsong Zeng, Germantown, MD (US)

(73) Assignee: The MITRE Corporation, McLean, VA (US)

( * ) Notice: Subject to any disclaimer, the term of this patent is extended or adjusted under 35 U.S.C. 154(b) by 239 days.

(21) Appl. No.: 13/273,713

(22) Filed: Oct. 14, 2011

(65) Prior Publication Data
US 2013/0094470 A1 Apr. 18, 2013

(51) Int. Cl.
*H04W 84/06* (2009.01)
(52) U.S. Cl.
USPC .......... 370/331; 370/315; 370/252; 370/329; 370/318
(58) Field of Classification Search
USPC ......... 370/331, 315–318, 329, 252, 230, 325; 455/431, 13.4, 13.3, 12.1
See application file for complete search history.

(56) References Cited

U.S. PATENT DOCUMENTS

| 7,505,479 | B2 * | 3/2009 | Meng | 370/465 |
| 8,150,409 | B2 * | 4/2012 | Kim et al. | 455/452.2 |
| 8,326,217 | B2 * | 12/2012 | Wahlberg et al. | 455/12.1 |
| 2005/0152466 | A1 * | 7/2005 | Maltsev et al. | 375/260 |
| 2007/0026795 | A1 * | 2/2007 | de La Chapelle | 455/13.4 |
| 2010/0020757 | A1 * | 1/2010 | Walton et al. | 370/329 |
| 2010/0041395 | A1 * | 2/2010 | Karabinis | 455/427 |
| 2010/0246704 | A1 * | 9/2010 | Ketchum et al. | 375/267 |
| 2011/0034166 | A1 * | 2/2011 | Karabinis et al. | 455/427 |

FOREIGN PATENT DOCUMENTS

IT EP 2447 929 A1 * 10/2010 ............ H04W 84/06

* cited by examiner

*Primary Examiner* — Dang Ton
*Assistant Examiner* — Sai Aung
(74) *Attorney, Agent, or Firm* — Sterne, Kessler, Goldstein & Fox P.L.L.C.

(57) ABSTRACT

Power control of a digital datalink system within an aeronautical telecommunication network is described herein. According to embodiments, the system is configured to calculate the transmission power of an air-based communication station, based on the transmission power used by a ground-based communication station, wherein the transmission power of the air-based communication station is sot to a decibel level higher than or equal to the transmission power of the ground-based communication station.

13 Claims, 5 Drawing Sheets

VDL2 POWER CONTROL

FIELD OF THE INVENTION

The present invention relates generally to providing power control of a digital datalink system within an aeronautical telecommunication network.

BACKGROUND OF THE INVENTION

Data communication is a key enabler to the FAA NextGen Air Transportation System program. The NextGen Air Transportation System program is a comprehensive overhaul of the National Airspace System (NAS) by the Federal Aviation Administration (FAA) in order to make air travel more convenient, dependable and safe. As the utilization of NextGen applications increases and services are materialized, the capacity demand on the data communication networks is growing. Conveying huge amounts of NextGen data traffic over the already fully occupied Aeronautical VHF frequency band is becoming a critical challenge to the overall NextGen success. The increase in data transmission capacity is supported by the development of new Aeronautical Telecommunication Network (ATN) protocols, which allow data rates up to 31.5 kbps in a single VHF channel, known as VHF Data Link Mode 2 (VDL 2).

Currently, the VDL 2 radios of air-based communication stations and ground-based communication stations do not have a sophisticated power control mechanism. Instead, these communication stations transmit data at a pre-fixed power level, which leads to limited channel spatial capacity, inefficient spectrum utilization, and eventually results in requiring an excessive amount of frequencies to meet the NextGen data communication demand. Accordingly, there is a need for a power control mechanism, which augments spatial capacity by reducing transmission power, thus boosting spectral efficiency.

BRIEF SUMMARY OF THE INVENTION

Embodiments of the present invention provide power control of a digital datalink system within an aeronautical telecommunication network. The system can be used to boost channel spatial capacity and enhance the spectrum efficiency of an aeronautical telecommunication subnetwork, such as VDL2. According to an embodiment, the system is configured to calculate the transmission power of an air-based communication station, based on the transmission power used by a ground-based communication station, wherein the transmission power of the air-based communication station is set to a decibel level higher than or equal to the transmission power of the ground-based communication station.

In an embodiment, a method for adding power control for a digital datalink system within an aeronautical telecommunication network includes determining a channel spatial capacity requirement of a ground-based communication station, determining a transmission power of the ground-based communication station based on the spatial capacity requirement, and issuing information representing the determined transmission power to a plurality of air-based communication stations within a coverage area zone of the ground-based communication station; wherein the transmission power of each of the air-based communication stations is calculated and set to a fixed decibel level higher than or equal to the transmission power of the ground-based communication station and receiving data from each of the air-based communication stations.

According to another embodiment, the system is configured to receive data from a plurality of ground-based communication stations, wherein the data represents a plurality of transmission powers of the ground-based communication stations, select a ground-based communication station from the plurality of ground-based communication stations, calculate a transmission power of the air-based communication station based on the transmission power of the selected ground-based communication station; wherein the transmission power of the air-based communication station is calculated and set to a fixed decibel level higher than or equal to the transmission power of the ground-based communication station, and issue information to the selected ground-based communication station.

According to an embodiment, the power control system uses a network architecture which includes frequency sharing and frequency reuse network architectures. The system and architecture results in taking up fewer spectrum bands to accommodate NextGen data demand, while also saving up to 90% of the spectrum required, as compared to a system without power control. Embodiments can be implemented using software, hardware, or a combination of software and hardware.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION OF THE INVENTION

Overview

Figure 1:
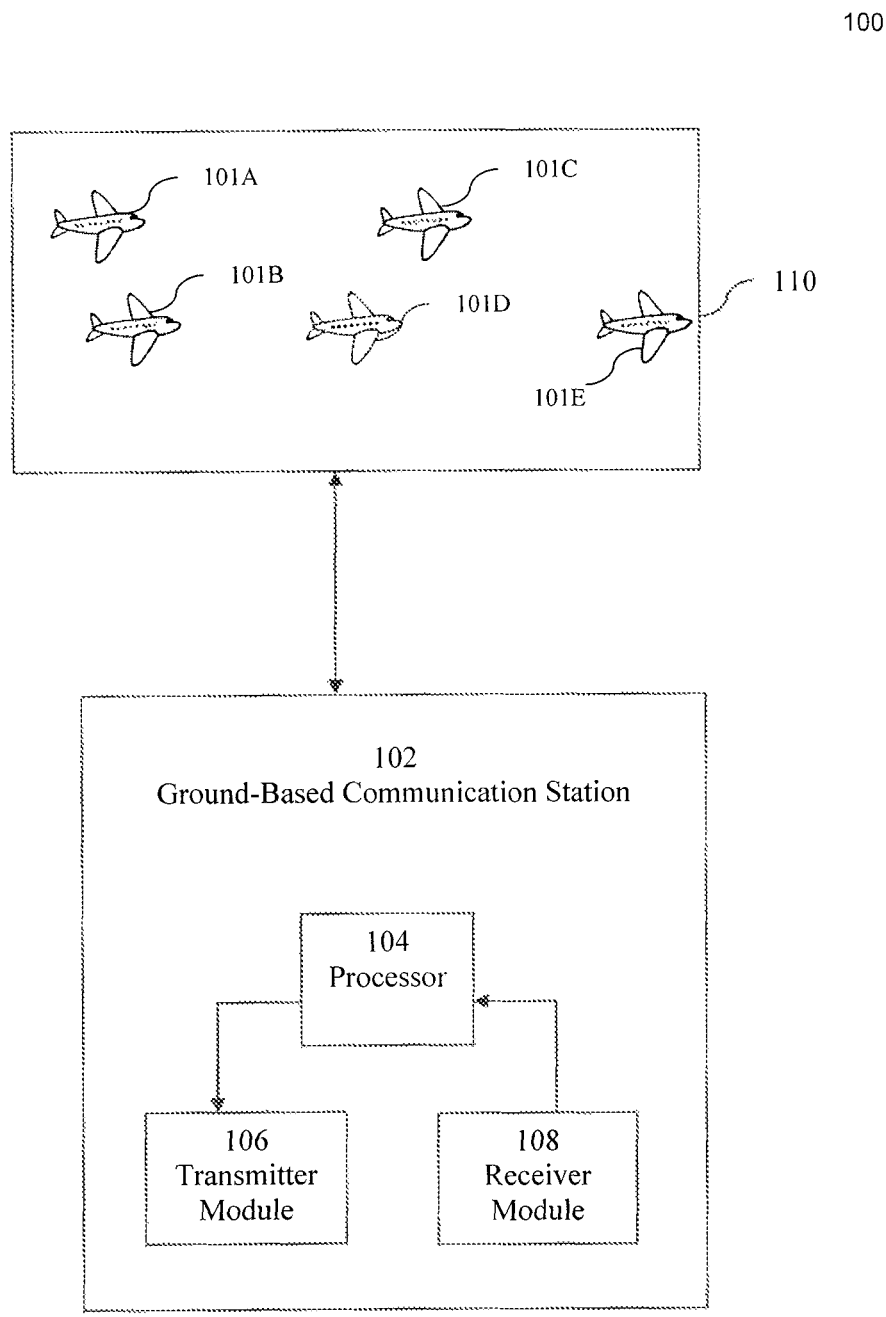
FIG. 1 illustrates an example system for adding power control for a digital datalink system within an aeronautical telecommunication network, according to an embodiment.

The push toward the FAA NextGen Air Transportation System leads to an ever-growing data traffic demand on the communication network. The RTCA, Inc. (RTCA) Air Traffic Management Advisory Committee (ATMAC) recommended to the FAA that the Very High Frequency Digital Link Mode 2 (hereinafter VDL2) should be the air/ground (A/G) data link to transfer both the Air Traffic Services (ATS) and Aeronautical Operational Control (AOC) messages. The VHF communication frequency band, from 117.975 to 137 MHz, is already congested with VDL2, Plain Old Aircraft Communication Addressing and Reporting System (ACARS) (POA), and Double Sideband-Amplitude Modulation (DSB-AM) voice communications. Thus, accommodating NextGen data communication demands without taking up too many VHF frequencies is becoming a critical challenge to VDL2 A/G network architecture design as well as to the overall FAA NextGen success.

For many years, ACARS has been the standard for air-ground/ground-air VHF data communications. With the increase of air travel along with the demand for data applications that utilize a lot of bandwidth, there has been an increased mandate for more aeronautical VHF communication channels. In order to meet this mandate, the aeronautical voice channel bandwidth has been decreased and new data modes have been introduced such as the VDL2. Currently, the VDL Mode 2 radios, either airborne stations (AS) or ground stations (GS), do not have a sophisticated power control mechanism and instead transmit data at a pre-fixed power level, which leads to limited channel spatial capacity, inefficient spectrum utilization, and eventually results in requiring an excessive amount of VDL Mode 2 frequencies to meet the NextGen data communication demand. The invention provides a power control mechanism, which augments spatial capacity by reducing transmission power, thus boosting spectral efficiency. Briefly stated, according to an embodiment, the invention operates as follows: A VDL2 ground station selects its power level according to the spatial capacity requirement at its location and broadcasts its power level using the ground station information frame (GSIF) to all aircraft within the ground station coverage range. Any aircraft wanting to communicate with this ground station will use a transmission power at a different level (such as a higher level) than the corresponding ground station power level.

VDL Mode 2 Subnetwork

Embodiments of the invention are described herein as being applicable to the VDL2 subnetwork, which is summarized here. However, it is noted that the invention is not limited to this example application, but is instead applicable to other communication protocols and applications as would be apparent to persons skilled in the art based on the teachings provided herein. For example, this invention may be extended to the Plain Old Aircraft Communications Addressing and Reporting System network. The VDL2 subnetwork provides data communications services between the aircraft and ground entities. It utilizes a network of ground stations to provide the desired airspace coverage using part of the VHF band allocated for aeronautical communications. This band is divided into multiple independent 25-kHz channels. A Carrier Sense Multiple Access (CSMA) protocol controls the media access between the aircraft and the ground station for each 25-kHz channel allocated for VDL2. CSMA is a probabilistic Media Access Control (MAC) protocol in which a node verifies the absence of other traffic before transmitting on a shared transmission medium, such as an electrical bus, or a band of the electromagnetic spectrum. A transmitter uses feedback from a receiver that detects a carrier wave before trying to send. It attempts to detect the presence of an encoded signal from another station before attempting to transmit. If a carrier is sensed, the station waits for the transmission in progress to finish before initiating its own transmission. Multiple stations send and receive on the medium. Transmissions by one node are generally received by all other stations using the medium.

The standards of the VDL Mode 2 subnetwork are defined in the ICAO VDL Mode 2 Standards and Recommended Practices. Per those standards, it is specified that the VDL Mode 2 subnetwork includes a physical layer, a data link layer and a subnetwork layer of the International Standard Organization Open Systems Interconnection 7-layer model. The physical layer uses a differentially encoded 8-phase shift keying (DP8SK) modulation, which allows operation at a burst rate of 31.5 kilobits per second (kbps) for each of the 25-kHZ channels. The physical layer generates a 108-bit training sequence for each frame transmitted. The datalink layer includes two sublayers and a management entity. The Media Access Control (MAC) sublayer uses a p-persistent CSMA protocol to control access to a shared 25-khz channel between the aircraft and ground stations. The Data Link Service (DLS) sublayer provides error detection, error recovery, and address identification of frames while supporting unicast and broadcast addresses. The Link Management Entity (LME) provides link management and release services between the local DLS and the remote DLS.

VDL2 Spatial Capacity

Spatial capacity is an indicator of data intensity in a transmission medium. Channel spatial capacity, $C_s$, is defined as the ratio of channel capacity over its coverage area, i.e., $$C_s \triangleq \frac{C}{\text{Coverage Area}} \quad (1)$$

Spatial capacity is inversely proportional to the transmission power and the coverage area.

$$C_s \propto \frac{1}{P_T} \quad (2)$$

$$C_s \propto \frac{1}{\text{Coverage Area}} = P_T \propto \text{Coverage Area} \quad (3)$$

Thus a power control mechanism where the ground-based communication station transmission power is set at a lower level than the air-based communication station will result in a network spatial capacity increase.

Example System Embodiments

FIG. 1 is an illustration of an example system 100 for adding power control for a digital datalink system within an aeronautical telecommunication network according to an embodiment of the present invention. Example system 100 can be implemented in software, hardware, or a combination of software and hardware. Example system 100 may implement a variety of methods, computational algorithms, and heuristics, further described below according to embodiments of the present invention.

As shown in FIG. 1, example system 100 includes a ground-based communication station 102 which includes a processor 104, a transmitter module 106, and a receiver module 108. Example system 100 is configured to add power control of a digital datalink system within an aeronautical telecommunication network.

According to embodiments, processor 104 is configured to determine a channel spatial capacity requirement of the ground-based communication station 102 and determine a transmission power of the ground-based communication station 102 based on the spatial capacity requirement. In an embodiment channel spatial capacity, $C_s$, is defined as the ratio of channel capacity over its coverage area, i.e., $$C_s \triangleq \frac{C}{\text{Coverage Area}} \quad (1)$$

When the coverage area is a perfect circle, the spatial capacity can be expressed as $$C_s = \frac{C}{\pi r^2} \quad (2)$$

For example, a VDL2 radio with a coverage range of 115 NM, has a VDL2 spatial capacity, $C_{s\_VDL2}$, of $$C_{s\_VDL2} = \frac{18 \times 10^3}{\pi 115^2} = 0.43 \ bps/nm^2 \quad (3)$$

In an embodiment, the ground based communication station 102 transmission power, $P_T$, can be expressed as $$P_T = Sen_{AS} + M_{safety} + M_{op} + L_{AS} - G_{AS} + PL - G_{GS} + L_{GS} \quad (4)$$

where
   $Sen_{AS}$: AS receiver sensitivity
   $M_{safety}$: safety margin
   $M_{op}$: AS operation margin
   $L_{AS}$: AS cable loss
   $G_{AS}$: AS antenna gain
   $G_{GS}$: GS antenna gain
   $L_{GS}$: GS cable loss
   PL: Free Space Path Loss=20 log(r)+20 log(f)+37.79 (where r is coverage range in NM and f is channel center frequency in MHz)

Transmitter module 106 may be configured to issue information representing the determined transmission power to a plurality of air-based communication stations within a coverage area zone 110 of the ground-based communication station 102. Thereafter, according to an embodiment the transmission power of each of the air-based communication stations 101A to 101E is calculated and set to a different decibel level higher than or equal to the transmission power of the ground-based communication station. For example transmitter module 106 periodically issues a Ground Station Information Frame (GSIF), which may be a broadcasted uplink that provides identification data of the ground-based communication station 102 along with information about available services. In an embodiment, the GSIF also contains information identifying the determined transmission power of the ground-based communication station 102. Upon receipt of the GSIF, each of the air-based communication stations 101A to 101E will extract the transmission power parameter from the GSIF and set its own transmission power to a different decibel level higher, such as but not limited to 2 dB more than the ground-based communication station transmission power.

Receiver module 108 may be configured to receive data from each of the air-based communication stations 101A to 101E, wherein a link connection is established between each of the air-based communication stations 101A to 101E and the ground-based communication station 102. For example, the air-based communication station 101A to 101E may be an aircraft including a VDL2 radio that establishes a connection with the ground-based communication station 102. The aircraft receives the GSIF generated by transmitter module 108 and depending on criteria, such as the phase-of-flight, will choose one of the VDL frequencies, and attempt to establish a connection with the ground-based communication station 102. In an embodiment a link connection is established using a frequency reuse network architecture. For example, the on-ground communication stations may use a 3-frequency reuse architecture to carry the data traffic to/from aircraft on the ground within the airport/terminal area, while the on-air data traffic sub-network may carry data traffic to/from aircraft that are flying in the air utilizing a 27-frequency reuse architecture.

Figure 2:
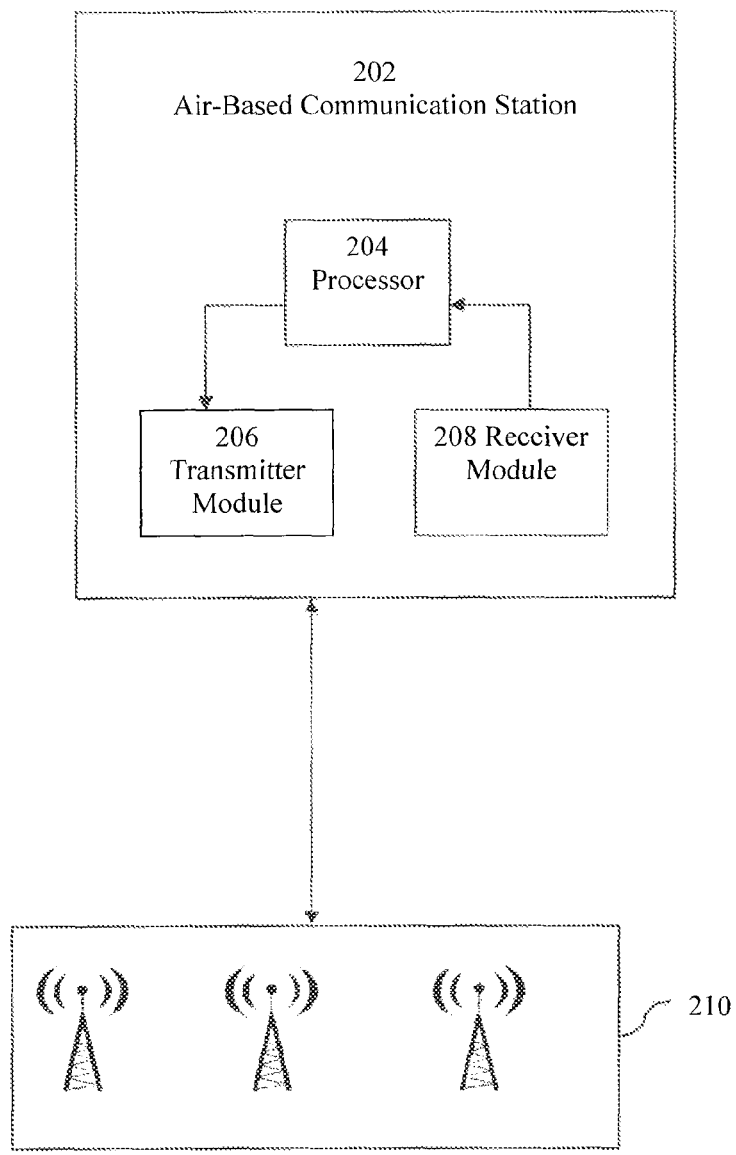
FIG. 2 illustrates another example system for adding power control for a digital datalink system within an aeronautical telecommunication network, according to an embodiment.

FIG. 2 illustrates an example system 200 for adding power control for a digital datalink system within an aeronautical telecommunication network according to an embodiment of the present invention. It is noted that the embodiments of the invention are described with reference to aeronautical applications but is not limited to this example as would be apparent to persons skilled in the art based on the teachings provided herein. Example system 200 can be implemented in software, hardware, or a combination of software and hardware. Example system 200 may implement a variety of methods, computational algorithms, and heuristics, further described below according to embodiments of the present invention.

As shown in FIG. 2, example system 200 includes an air-based communication station 202 which includes a processor 204, a transmitter module 206, and a receiver module 208. Example system 200 is configured to add power control of a digital datalink system within an aeronautical telecommunication network.

According to embodiments, receiver module 208 may be configured to receive data from a plurality of ground-based communication stations 210, wherein the data represents a plurality of transmission powers of the ground-based communication stations 210. In an embodiment, the received data is a Ground Station Information Frame (GSIF). In an embodiment, data received from a plurality of ground-based communication stations is received periodically via a broadcast by each of the ground-based communication stations 210.

Processor 204 may be configured to select a ground-based communication station from the plurality of ground-based communication stations 210, wherein an initial link connection is established between the air-based communication station 202 and the selected ground-based communication station. Thereafter the processor 204 calculates a transmission power of the air-based communication station 202 based on the transmission power of the selected ground-based communication station, wherein the transmission power of the air-based communication station 202 is calculated and set to a different decibel level (such as a higher level) than the transmission power of the ground-based communication station 210. In an embodiment, the transmission power level of the air-based communication station may vary and change when a handoff is initiated resulting in the air-based communication station 202 establishing communication with another ground-based communication station.

In an embodiment each of the plurality of ground-based communication stations 210 is a Very High Frequency Mode 2 radio. In an embodiment, an air-based communication station 202 is an aircraft comprising a Very High Frequency Mode 2 radio. In an embodiment a link connection is a link management entity. For example, the air-based communication station 202 may be an aircraft with a VDL2 radio that establishes a connection with one of the ground-based communication stations 210. The aircraft receives the GSIF generated by transmitter module 108 and depending on criteria, such as the phase-of-flight, will choose one of the VDL2 frequencies, and attempt to establish a connection with the ground-based communication station 202 using a link management entity. In an embodiment a link connection is established using a frequency reuse network architecture. For example, the on-ground communication stations may use but not limited to a 3-frequency reuse architecture to carry the data traffic to/from aircraft on the ground within the airport/terminal area, while the on-air data traffic sub-network may carry data traffic to/from aircraft that are flying in the air utilizing but not limited to a 27-frequency reuse architecture.

Example Method Embodiments

Example methods according to embodiments of the present invention will now be provided for the purpose of illustration. These example methods may be performed by the example system embodiments described above, and can be implemented using software, hardware, or a combination of software and hardware.

Figure 3:
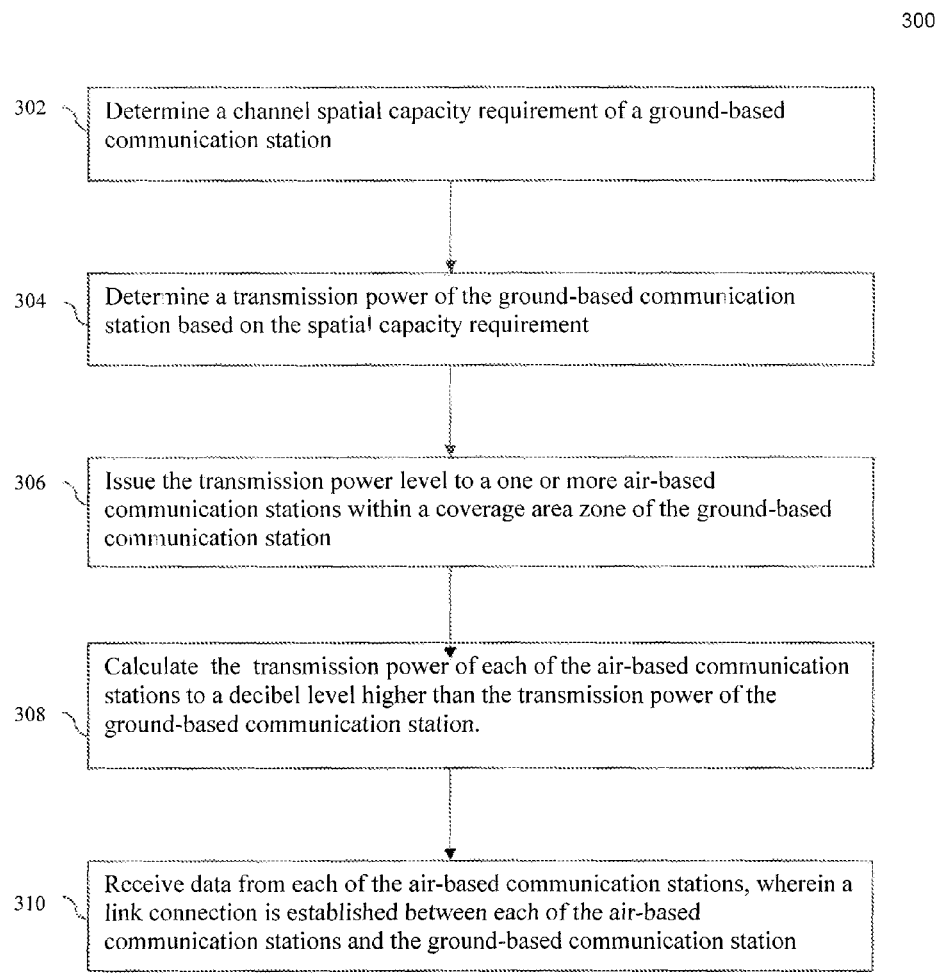
FIG. 3 is a process flowchart of a method for adding power control for a digital datalink system within an aeronautical telecommunication network, according to an embodiment.

FIG. 3 is a process flowchart 300 for adding power control of a digital datalink system within an aeronautical telecommunication network according to an embodiment of the present invention.

As shown in FIG. 3, process 300 begins at step 302, which includes determining a channel spatial capacity requirement of a ground-based communication station. In an embodiment, step 302 includes determining the channel spatial capacity requirement by defining spatial capacity requirement as the ratio of channel capacity over its coverage area.

In step 304, a transmission power of the ground-based communication 102 based on the spatial capacity requirement is determined.

In step 306, information representing the determined transmission power is communicated to a plurality of air-based communication stations 101A to 101E within a coverage area zone of the ground-based communication station 102. In an embodiment, the information communicated by the ground-based communication station 102 is a Ground Station Information Frame, which is broadcasted periodically to a plurality of air-based communication stations 101A to 101E.

In step 308, the transmission power of each of the air-based communication stations 101A to 101E is calculated and set to a different decibel level (such as a higher level) than the transmission power of the ground-based communication station 102.

In step 310, data from each of the air-based communication stations 101A to 101E is received wherein a link connection is established between each of the air-based communication stations 101A to 101E and the ground-based communication station 102. In an embodiment, the data may be downlink message identifying the aircraft and its applicable flight information.

Figure 4:
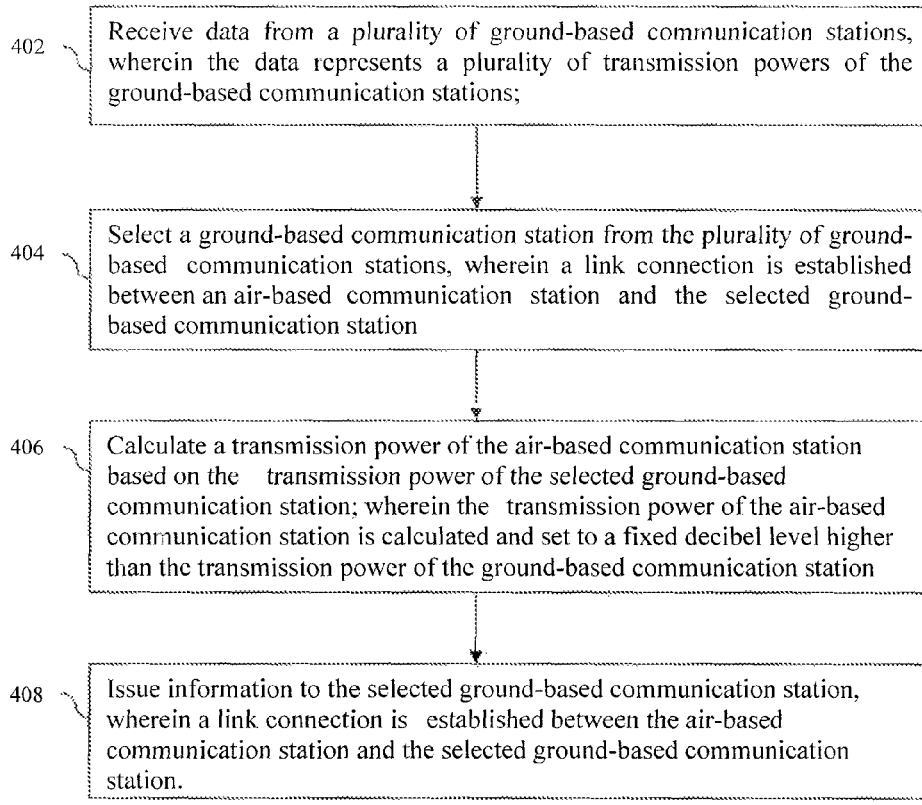
FIG. 4 is a process flowchart of another method for adding power control for a digital datalink system within an aeronautical telecommunication network, according to an embodiment.

FIG. 4 is another process flowchart 400 for adding power control of a digital datalink system within an aeronautical telecommunication network according to an embodiment of the present invention.

At step 402, data is received by an air-based communication station 202 from a plurality of ground-based communication stations 210, wherein the data identifies the respective transmission powers of the ground-based communication stations 210. In an embodiment, each of the plurality of ground-based communication stations 210 is a Very High Frequency Mode 2 radio. In an embodiment, an air-based communication station 202 is an aircraft with a Very High Frequency Mode 2 radio.

In an embodiment the data received from the plurality of ground-based communication stations 210 is a GSIF. In an embodiment, the data received from the plurality of ground-based communication stations 210 is received periodically via a broadcast by each of the ground-based communication stations 210.

In step 404, the air-based communication station 202 selects a ground-based communication station from the plurality of ground-based communication stations 210, wherein a link connection is established between the air-based communication station 202 and the selected ground-based communication station.

In step 406, the air-based communication station 202 calculates a transmission power based on the transmission power of the selected ground-based communication station. This transmission power of the air-based communication station 202 is calculated and set to a different decibel level (such as a higher level) than the transmission power of the ground-based communication station.

In step 408, the air-based communication station 202 issues information to the selected ground-based communication station, wherein a link connection is established between the air-based communication station 202 and the selected ground-based communication station.

Example Computer System Implementation

Figure 5:
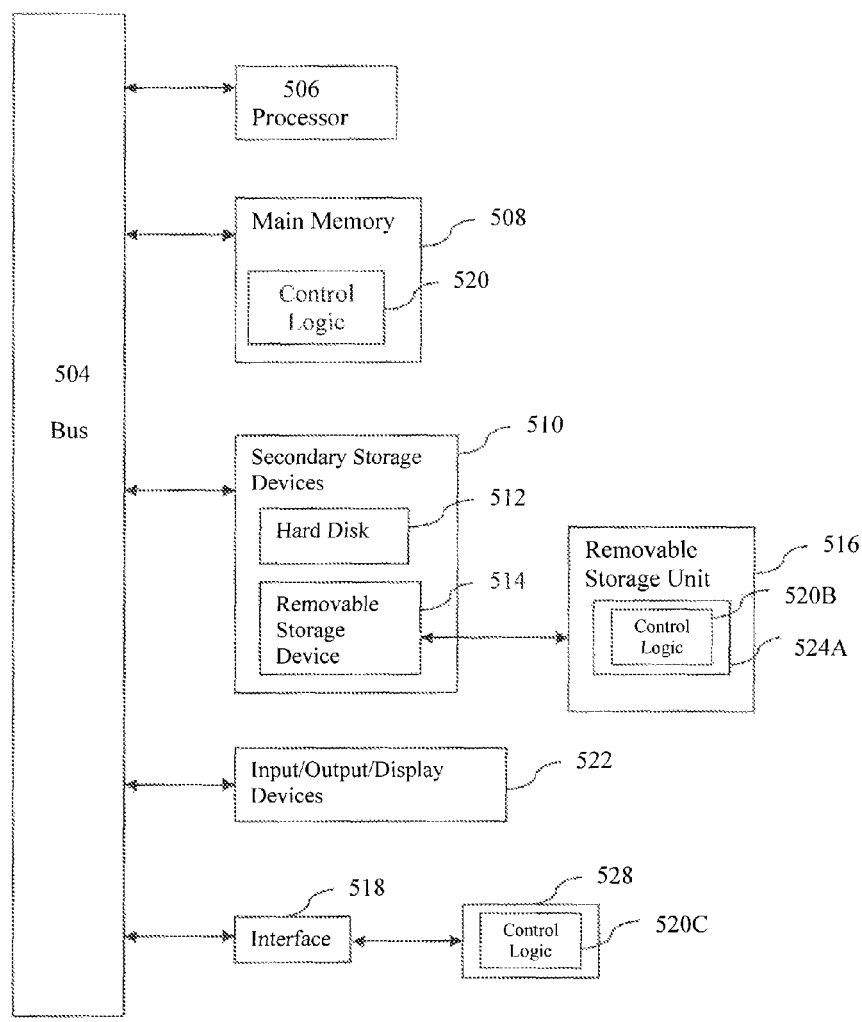
FIG. 5 is an example computer system capable of implementing embodiments of the present invention.

Various aspects of embodiments the present invention can be implemented using software, firmware, hardware, or a combination thereof. FIG. 5 illustrates an example computer system 500 in which embodiments of the present invention, or portions thereof, can be implemented as computer-readable code. For example, the methods illustrated by process flowcharts 300 and 400 can be implemented in system 500. However, after reading this description, it will become apparent to a person skilled in the relevant art how to implement embodiments using other computer systems and/or computer architectures.

Computer system 500 includes one or more processors, such as processor 506. Processor 506 can be a special purpose or a general purpose processor. Processor 506 is connected to a communication infrastructure 504 (for example, a bus or network).

Computer system 500 also includes a main memory 508 (e.g., random access memory (RAM)) and secondary storage devices 510. Secondary storage 510 may include, for example, a hard disk drive 512, a removable storage drive 514, and/or a memory stick. Removable storage drive 514 may comprise a floppy disk drive, a magnetic tape drive, an optical disk drive, a flash memory, or the like. Removable storage drive 514 reads from and/or writes to a removable storage unit 516 in a well-known manner. Removable storage unit 516 may comprise a floppy disk, magnetic tape, optical disk, etc. which is read by and written to by removable storage drive 514. As will be appreciated by persons skilled in the relevant art(s), removable storage unit 516 includes a computer usable storage medium 524A having stored therein computer software and/or logic 520B.

Computer system 500 may also include a communications interface 518. Communications interface 518 allows software and data to be transferred between computer system 500 and external devices. Communications interface 518 may include a modem, a network interface (such as an Ethernet card), a communications port, a PCMCIA slot and card, or the like. Software and data transferred via communications interface 518 are in the form of signals which may be electronic, electromagnetic, optical, or other signals capable of being received by communications interface 518. These signals are provided to communications interface 518 via a communications path 528. Communications path 528 carries signals and may be implemented using wire or cable, fiber optics, a phone line, a cellular phone link, an RF link or other communications channels.

In this document, the terms "computer usable medium" and "computer readable medium" are used to generally refer to media such as removable storage unit 516 and a hard disk installed in hard disk drive 512. Computer usable medium can also refer to memories, such as main memory 508 and secondary storage devices 510, which can be memory semiconductors (e.g. DRAMs, etc.).

Computer programs (also called computer control logic) are stored in main memory 508 and/or secondary storage devices 510. Computer programs may also be received via communications interface 518. Such computer programs, when executed, enable computer system 500 to implement embodiments of the present invention as discussed herein. In particular, the computer programs, when executed, enable processor 506 to implement the processes of the present invention. Where embodiments are implemented using software, the software may be stored in a computer program product and loaded into computer system 500 using removable storage drive 514, interface 518, or hard drive 512.

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method in a ground-based communication station for power control of a digital datalink system within an aeronautical telecommunication network, comprising:
   determining a channel spatial capacity requirement of the ground-based communication station, wherein a channel spatial capacity requirement is determined based on a ratio between a channel capacity of the ground-based communication station and a coverage area zone of the ground-based communication station;
   determining a transmission power of the ground-based communication station based on the spatial capacity requirement such that the channel spatial capacity of the ground-based communication station is increased and inversely proportional to the transmission power and the coverage area zone of the ground-based communication station;
   issuing information representing the determined transmission power to one or more air-based communication stations within the coverage area zone of the ground-based communication station, wherein a transmission power of each of the air-based communication stations is calculated and set to a decibel level higher than or equal to the transmission power of the ground-based communication station; and
   receiving data from each of the air-based communication stations.

2. The method of claim 1, wherein the spatial capacity requirement of a ground-based communication station is defined as a ratio of channel capacity over its coverage area.

3. The method of claim 1, wherein the information issued is a Ground Station Information Frame.

4. The method of claim 1, wherein the information issued is received periodically by the ground-based communication station.

5. The method of claim 1, wherein the ground-based communication station is a Very High Frequency Mode 2 radio.

6. The method of claim 1, wherein each of the air-based communication stations is an aircraft comprising a Very High Frequency Mode 2 radio.

7. The method of claim 1, wherein the transmission power of the one or more air-based communication stations changes when a handoff is initiated.

8. A non-transitory computer program product comprising a tangible computer useable hardware medium including control logic stored therein, the control logic when executed by one or more processors causing the processor to perform operations to control power of a digital datalink system within an aeronautical telecommunication network, the operations comprising:
   determining a channel spatial capacity requirement of the ground-based communication station, wherein a channel spatial capacity requirement is determined based on a ratio between a channel capacity of the ground-based communication station and a coverage area zone of the ground-based communication station;
   determining a transmission power of the ground-based communication station based on the spatial capacity requirement such that the channel spatial capacity of the ground-based communication station is increased and inversely proportional to the transmission power and the coverage area zone of the ground-based communication station;
   issuing information representing the determined transmission power to a plurality of air-based communication stations within a coverage area zone of the ground-based communication station, wherein a transmission power of each of the air-based communication stations is calculated and set to a decibel level higher than or equal to the transmission power of the ground-based communication station; and
   receiving data from each of the air-based communication stations.

9. A method in an air-based communication station for power control of a digital datalink system within an aeronautical telecommunication network, comprising:
   receiving data from one or more ground-based communication stations, wherein the data represents the respective transmission powers of the ground-based communication stations and the respective transmission powers are determined such that a channel spatial capacity of the ground-based communication stations is increased and inversely proportional to the transmission powers and a coverage area zone of the ground-based communication stations;
   selecting a ground-based communication station from the plurality of ground-based communication stations;
   calculating a transmission power of the air-based communication station based on the transmission power of the selected ground-based communication station;
   wherein the transmission power of the air-based communication station is calculated and set to a fixed decibel level higher than or equal to the transmission power of the ground-based communication station; and
   issuing information to the selected ground-based communication station.

10. An air-based communication station, comprising:
   a memory; and
   at least one processor coupled to the memory, the at least one processor configured to:
   receive data from one or more ground-based communication stations, wherein the data represents respective transmission powers of the ground-based communication stations and the transmission powers are determined such that a channel spatial capacity of the ground-based communication stations is increased and inversely proportional to the transmission power and a coverage area zone of the ground-based communication stations;

select a ground-based communication station from the one or more ground-based communication stations and calculate a transmission power of the air-based communication station based on the transmission power of the selected ground-based communication station; wherein the transmission power of the air-based communication station is calculated and set to a decibel level higher than or equal to the transmission power of the ground-based communication station; and issue information to the selected ground-based communication station.

11. The method of claim 1, wherein the channel spatial requirement is based on a shape of the coverage area zone of the ground-based communication station.

12. The method of claim 1, further comprising determining the transmission power of the ground-based communication station based on a receiver sensitivity of the ground-based communication station, a margin of the ground-based communication station, and an antenna gain of the ground-based communication station.

13. The method of claim 1, further comprising establishing a link connection using a frequency reuse network architecture, wherein the link connection enables transmission between the ground-based communication station and the one or more air-based communication stations.

* * * * *

UNITED STATES PATENT AND TRADEMARK OFFICE
CERTIFICATE OF CORRECTION

PATENT NO. : 8,780,862 B2  Page 1 of 1
APPLICATION NO. : 13/273713
DATED : July 15, 2014
INVENTOR(S) : Dongsong Zeng It is certified that error appears in the above-identified patent and that said Letters Patent is hereby corrected as shown below:

On the title page, item (57), replace "station is sot to" with --station is set to--.

Signed and Sealed this
Seventh Day of October, 2014

Michelle K. Lee
*Deputy Director of the United States Patent and Trademark Office*